United States Patent [19]
Gordon

[11] Patent Number: 5,624,524
[45] Date of Patent: Apr. 29, 1997

[54] PLASTIC LAMINATE CONSTRUCTION AND METHOD OF MAKING THEREOF

[76] Inventor: Carl C. Gordon, 300 E. 46th St., New York, N.Y. 10017

[21] Appl. No.: 509,566

[22] Filed: Jul. 31, 1995

Related U.S. Application Data

[62] Division of Ser. No. 292,682, Aug. 18, 1994.

[51] Int. Cl.$^6$ .......................... B32B 31/20; C09J 5/02; C09J 5/06
[52] U.S. Cl. .......................... 156/311; 156/312; 156/324
[58] Field of Search .......................... 156/324, 311, 156/312, 309.9, 103; 428/483, 451, 520

[56] References Cited

U.S. PATENT DOCUMENTS

| | | | |
|---|---|---|---|
| 3,681,167 | 8/1972 | Moore | 156/312 |
| 3,852,136 | 12/1974 | Plumat | 156/103 |
| 4,193,830 | 3/1980 | Milne | 156/312 |
| 4,293,603 | 10/1981 | Hayman-Chaffey | 428/86 |
| 4,463,053 | 7/1984 | Brinegar | 156/71 |
| 5,443,669 | 8/1995 | Tunker | 156/103 |

*Primary Examiner*—Daniel Stemmer
*Attorney, Agent, or Firm*—Stroock & Stroock & Lavan

[57] ABSTRACT

A plastic laminate includes an acrylic sheet and layer of paint disposed thereon. A polyester sheet has a layer of adhesive disposed thereon. The adhesive layer is bonded directly to the paint layer. The laminate is formed by applying the paint layer to the acrylic sheet and thoroughly drying the paint layer. The polyester sheet is heated to a temperature to melt the hot melt adhesive and the heated adhesive is applied to the paint layer under pressure while the paint layer is being cooled. The entire laminate is then also cooled to room temperature under pressure.

7 Claims, 1 Drawing Sheet

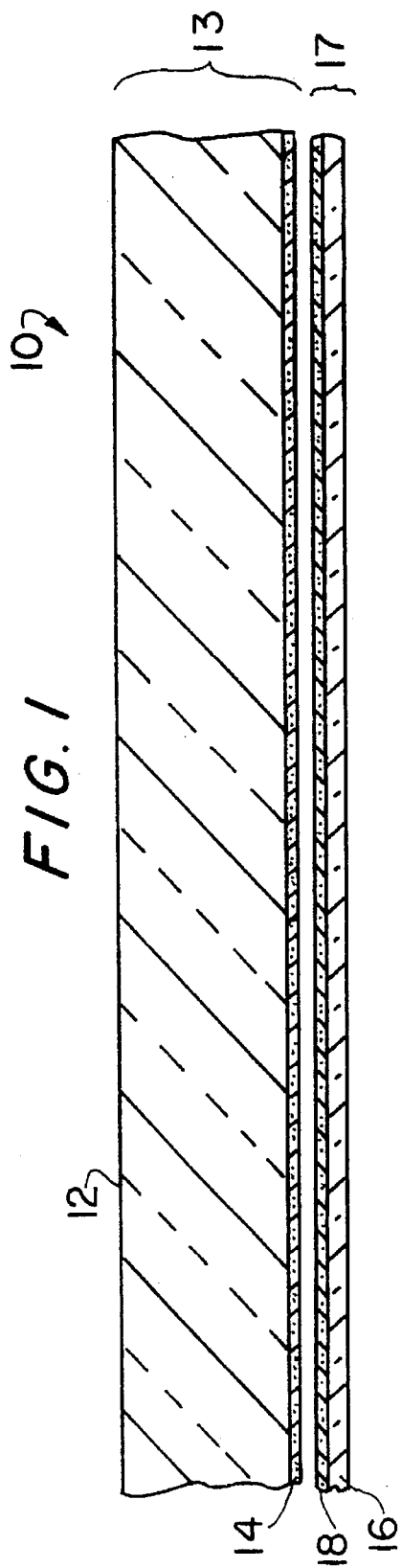
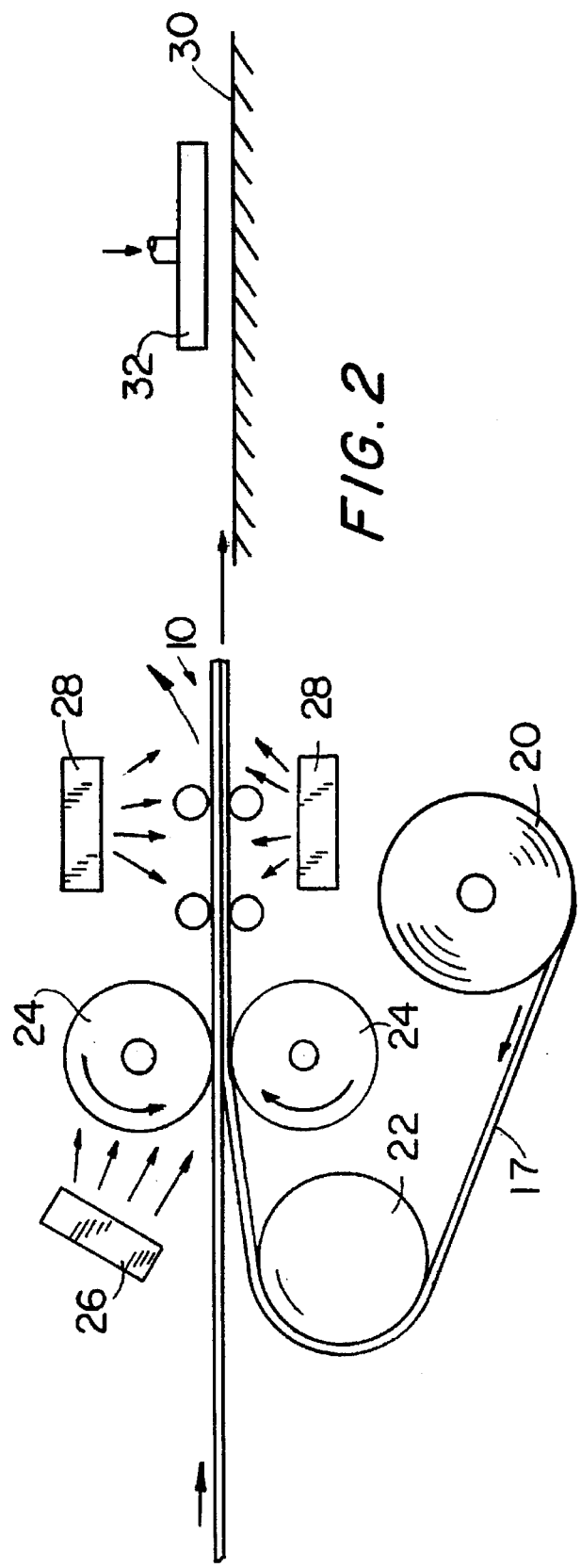

5,624,524

PLASTIC LAMINATE CONSTRUCTION AND METHOD OF MAKING THEREOF

This is a divisional application of U.S. patent application Ser. No. 08/292,682, filed Aug. 18, 1994 (pending).

BACKGROUND OF THE INVENTION

This invention relates to a plastic laminate construction and a method for making thereof, and in particular, a plastic laminate construction capable of being painted without the use of primer and which is more suitable for use in connection with light sources and furniture.

It is known from U.S. Pat. No. 4,293,603 to utilize laminates as an outer decorative coating, and in particular for use with furniture. In the prior art, a transparent acrylic sheet is coated with an acrylic paint coating composition on one side in a predetermined color and decorative pattern. The coated sheet is attached to a backing member or to furniture utilizing a solvent based cement as an adhesive.

Although satisfactory, because of the use of a solvent based cement with acrylic paint a primer between the paint layer and the adhesive must be used as a barrier to protect the paint layer from the solvents in the paint. The primer dulls the paint colors which are no longer as aesthetically pleasing. Furthermore, the prior art laminate becomes overly opaque and therefore does not lend itself for use in furniture such as lampshades where a light source is placed behind the laminate construction. Accordingly, it is desired to provide a plastic laminate construction which overcomes the shortcomings of the prior art.

SUMMARY OF INVENTION

Generally speaking, in accordance with the invention a plastic laminate includes an acrylic sheet and layer of paint disposed thereon. A polyester sheet has a layer of hot melt adhesive disposed thereon. The adhesive is bonded to the paint layer.

The laminate is formed by applying the paint layer to the acrylic sheet and thoroughly drying the paint layer. The polyester sheet is heated to a temperature to melt the hot melt adhesive and the heated adhesive is applied to the paint layer under pressure while the paint layer is being cooled. The entire laminate is then also brought to room temperature under pressure.

Accordingly, it is an object the present invention to provide an improved plastic laminate construction.

Another object of the invention is to provide a laminate construction which does not dull the colors of the paint, providing enhanced aesthetic value.

Yet another object of the invention is to provide a plastic laminate construction which allows light to pass there through.

Still another object of the invention is to provide a plastic laminate which is malleable.

A further object of the invention is to provide a plastic laminate which removes the need for primers by controlling the application of the paint and the adhesive.

Still another object of the invention is to provide a plastic laminate which removes the need for primers by utilizing the paint line as the adhesive.

Still other objects of the invention will in part be obvious and in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTIONS OF THE DRAWINGS

For a fuller understanding of the invention, reference is had to the following description taken in connection with the accompanying drawings, in which:

FIG. 1 is a sectional view of a plastic laminate formed in accordance with the invention; and FIG. 2 is a side elevational view of a laminate constructed in accordance with the invention and a partial schematic diagram of an apparatus utilized to form a laminate.

DESCRIPTION OF THE PREFERRED EMBODIMENTS

Reference is now made to FIG. 1 in which a laminate, generally indicated as 10 constructed in accordance with the invention is shown. A sheet of substantially transparent semirigid acrylic 12 has a thickness of about 0.125 inches. A layer of paint 14 is unevenly applied to a first surface of acrylic film 12. A polyester film 16 is substantially transparent. In an exemplary embodiment sheet 16 is formed as a 0.010 inches thick sheet of polyester. A layer 18 of aggressive hot melt adhesive is disposed between polyester film 16 and paint layer 14. Prior to formation adhesive 18 and polyester film 16 form a half laminate 17 and paint layer 14 and acrylic sheet 12 form a half laminate 13.

Reference is now made to FIG. 2 wherein an apparatus for forming laminate 10 is provided. Half laminate 17 is stored on a roll 20 and is fed to heated roller 22. Heated roller 22 is heated at a temperature of about 335°. Nip rollers 24 are provided downstream of heated roller 22. A fan 26 cools the upper nip roller 24. Fans are disposed on either side of the formed laminate 10 downstream of nip rollers 24. Downstream of fans 28 is a table 30 and chilled weight 32.

To form laminate 10, the layer of paint 14 is applied to acrylic sheet 12. The paints are thoroughly dried prior to formation of the entire laminate 10. This is so that the acrylic sheet and paints are essentially stable. If the color line is a solid color, paint may be applied by a roller or spray and then air dried. If the color line is a melange of colors or provides any form of translucency, hue or the like the color line is applied by a spatter brush or sponge to the acrylic sheet and then air dried. The color can be a translucent color, it can be a tinting, or a hue or a stain or combinations of these as well as the opaque paints. The less opaque the paint, the more light will pass therethrough allowing the laminate to be used as a window, or shower doors, lampshades or the like.

At the same, half laminate 17 is heated by heated roller 22. In a preferred embodiment, heated roller 22 is a teflon coated electric roller at a temperature of about 335° so that half laminate 17 is heated to a temperature of between 320° and 335° F. to activate the hot melt adhesive. Heated half laminate 17 and dried half laminate 13 are then pressed together by nip rollers 24, the adhesive layer 18 contacting paint layer 14. To maintain the stability of the paint layer 14 on acrylic sheet 12, fan 26 cools half laminate 13 during the nip process to prevent acrylic sheet 12 from rising above a temperature of 106° F. After formation of laminate 10 at nip rollers 24 laminate 10 is further cooled by fans 28.

In an exemplary embodiment, laminate 10, half laminate 17 and half laminate 13 are fed between nip rollers 24 and fans 28 at a speed no less about four linear feet per minute to prevent color deformation.

Laminate 10 is brought to room temperature by being positioned on table 30 and having two and half pounds per square feet of pressure applied thereto by a cool weight 32 until room temperature has been obtained.

The combination of pressure and heat changes the characteristic of paint layer 14, burnishing the paint, making the paint line appear shinier and more metallic, providing shine and a lustre to the laminate construction. Furthermore, because layers 12 and 16 are transparent, the laminate is not excessively opaque so that light is only blocked by paint layer 14. As a result, light illuminates the paint as it passes therethrough improving the aesthetic affect.

By drying paint layer 14 prior to its contact with the hot melt adhesive and by maintaining the temperature of the bond line between the paint and acrylic adhesive at a relatively low temperature, the paint is maintained substantially stable and the adhesive does not attack the paint and as a result color degradation does not occur.

Paint layer 14 is applied to polyester layer 12 any one of a number of ways known in the art. Paint layer 14 may be rolled on or sprayed on, varying the thickness dependent upon the amount of desired translucence and desired colors. If patterns or a plurality of colors are desired, then different colors may be built upon each other to change patterns and colors when light passes therethrough. By way of example, to obtain green, a blue layer may be built up upon a yellow layer so that the laminate will exhibit green from light passing therethrough. Furthermore, by utilizing a backing layer formed as a transparent film, light passes through the laminate, reflecting from and picking up color from the underlying surface to which the laminate is applied, also affecting the overall appearance of the laminate. It should be noted that acrylics and polyesters are used by way of example, and that any transparent semi-rigid plastic capable of supporting a paint and/or a heated adhesive and undergo pressure may be used as the films in the plastic laminate construction.

It will thus be seen that the objects set forth above, among those made apparent from the preceding description, are efficiently attained, and, since certain changes may be made to the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language might be said to fall therebetween.

What is claimed:

1. A method for forming a plastic laminate comprising the steps of:

applying a paint layer to an acrylic sheet;

drying said paint layer on said acrylic sheet;

applying a layer of hot melt adhesive to a polyester sheet;

heating said polyester sheet and hot melt adhesive;

pressing said layer of hot melt adhesive to said paint layer while cooling and maintaining said paint layer below a predetermined temperature to form said plastic laminate and to maintain the stability of said paint layer; and bringing said plastic laminate to room temperature while under pressure.

2. The method of claim 1, wherein said hot melt adhesive is heated to a temperature between 320° and 335° F.

3. The method of claim 1, wherein said adhesive layer is pressed against said paint layer by feeding said adhesive layer and said paint layer between nip rollers.

4. The method of claim 3, wherein said acrylic sheet and polyester sheet are fed between said nip rollers at a rate of at least four linear feet per minute.

5. The method of claim 1, wherein said predetermined temperature is no greater than 106° F.

6. The method of claim 5, wherein said acrylic layer is cooled and maintained below said predetermined temperature by a fan.

7. The method of claim 1, wherein the laminate is brought to room temperature at a pressure of two and half pounds per square foot.

* * * * *